June 17, 1958  A. L. BROCKWAY, JR  2,839,748
ANTENNA BEAM ANGLE INDICATION SYSTEM
Filed Aug. 20, 1951  4 Sheets-Sheet 3
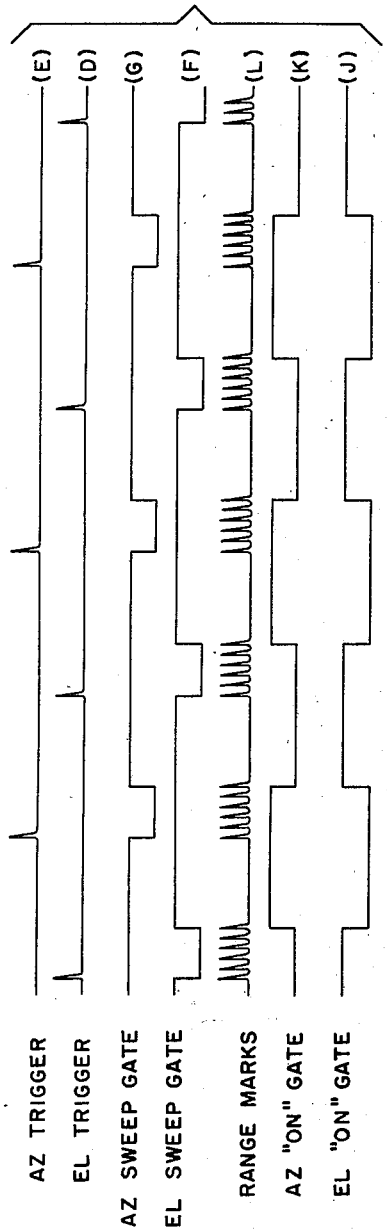
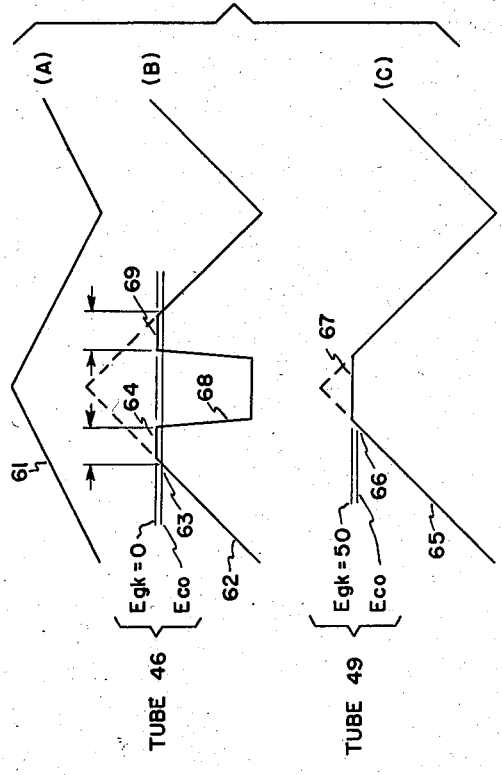
INVENTOR.
ARTHUR L. BROCKWAY, JR.
BY

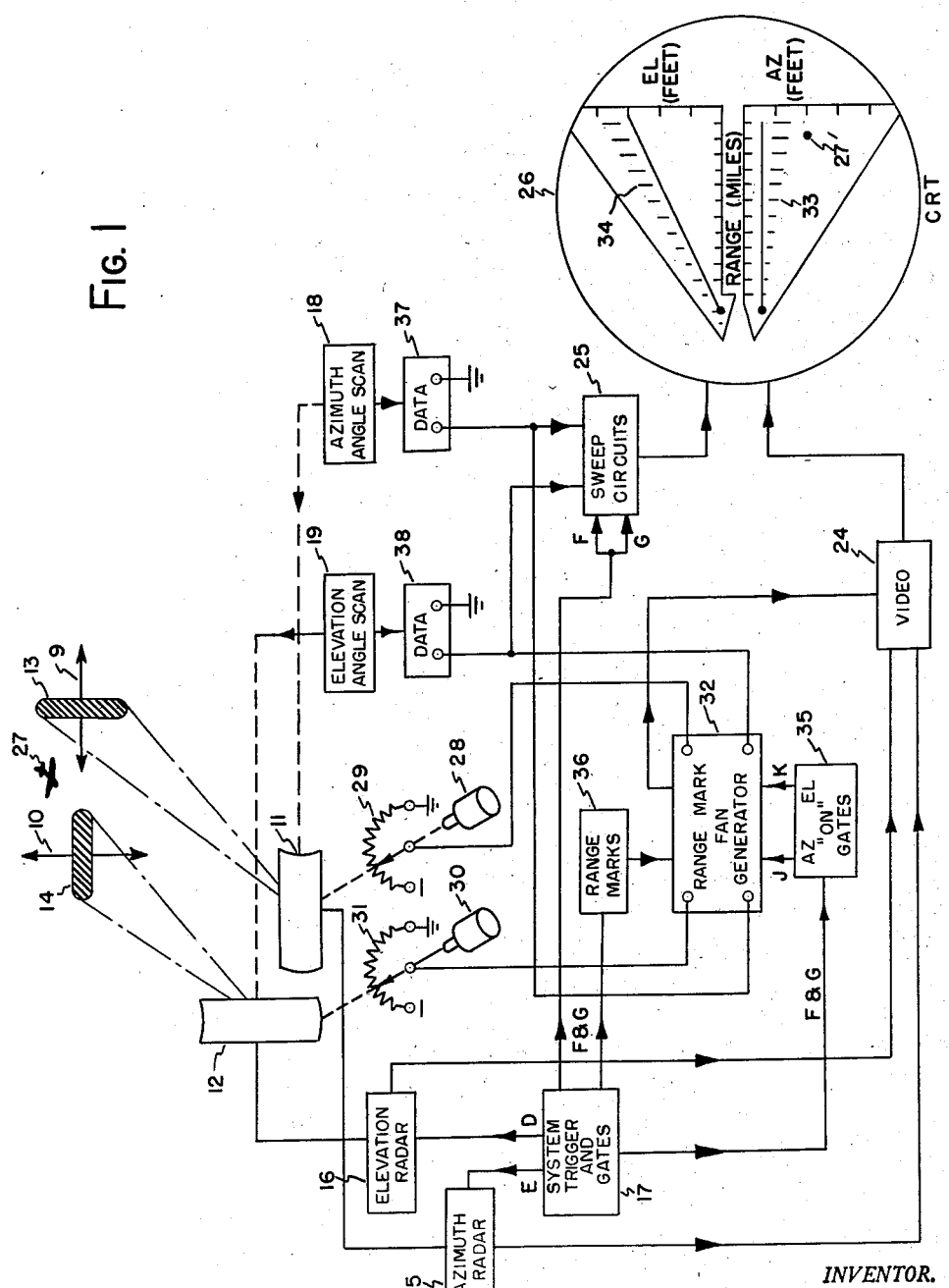

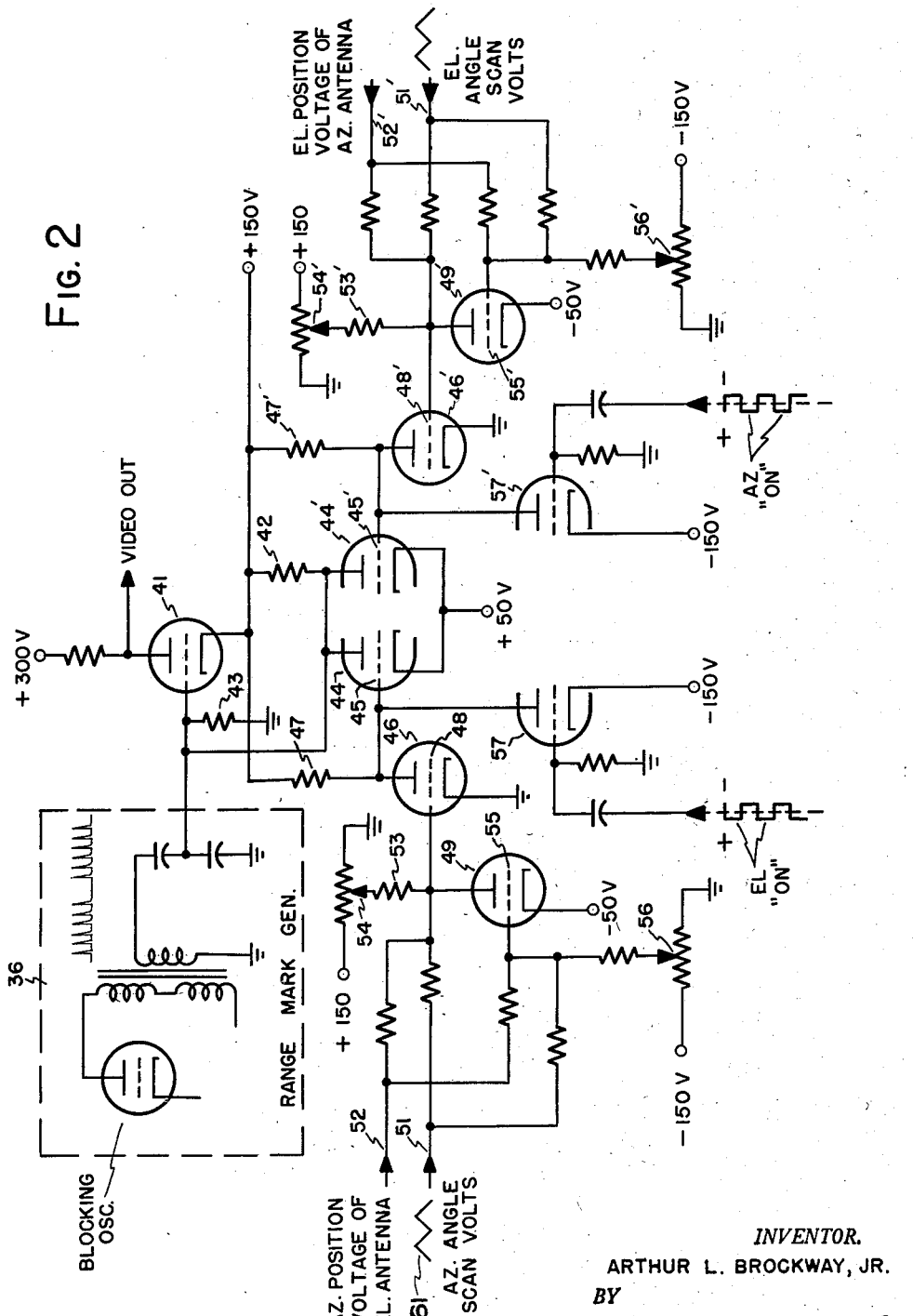

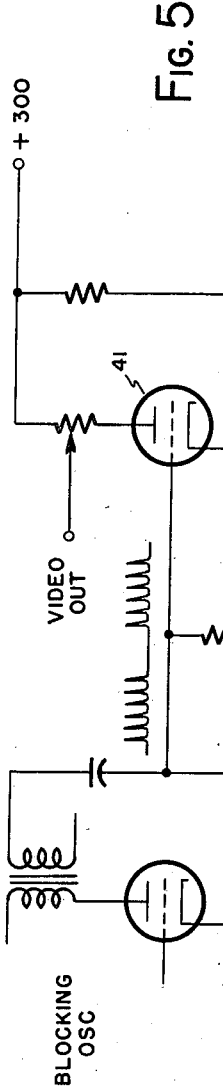
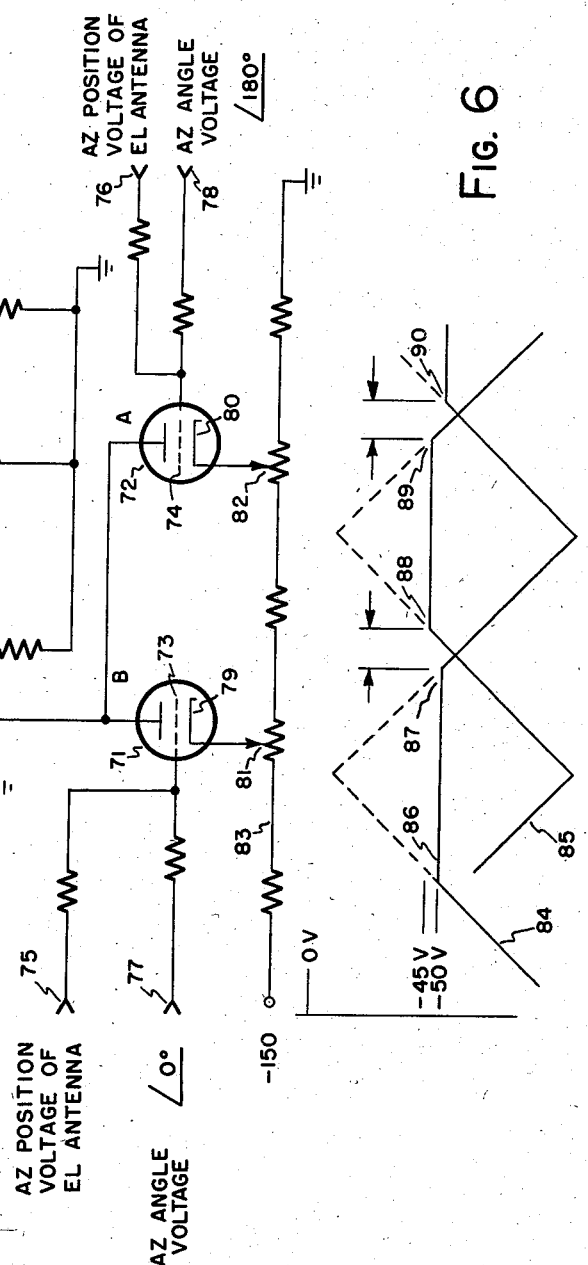

United States Patent Office 2,839,748
Patented June 17, 1958

2,839,748

ANTENNA BEAM ANGLE INDICATION SYSTEM

Arthur L. Brockway, Jr., Baltimore, Md., assignor to Bendix Aviation Corporation, Towson, Md., a corporation of Delaware Application August 20, 1951, Serial No. 242,700

10 Claims. (Cl. 343—11)

This invention relates generally to improvements in cathode-ray tube displays and has particular application to such displays as they are employed in ground controlled approach (GCA) aircraft landing systems. Such systems and displays, for example, are disclosed and claimed in the copending application for "Indicator Arrangement for Radio Echo System," Serial No. 138,428, filed January 13, 1950, now Patent No. 2,611,947, issued Sept. 30, 1952, and assigned to the same assignee as the present invention.

Prior art GCA systems are well known wherein radar means are employed to systematically scan a limited sector of space with individual horizontal and vertical plane directive antennae to provide azimuth (AZ) and elevation (EL) information of nearby aircraft with respect to range. In such devices it has been the practice, owing to the peculiar shape of the antennae beams, to provide an indication in the form of a "fan" on the cathode-ray indicators of the location of the beam of the antenna not individual thereto. In such a system when echo signals are received by one radar system the position of the other antenna beam relative thereto is indicated and may be oriented by suitable controls to secure and maximize the echo signal in each radar system.

An object of the present invention is to provide an improved composite image on a cathode-ray indicator device.

Another object is to provide a GCA system having an improved composite indication under the control of essentially D. C. voltage.

A further object is to provide an improved "fan" indication of the beam position of an antenna which is not intermittent with respect to forward and reverse scanning of the beam position.

Another object is to provide an improved indicator "fan" having improved provision for independent orientation and individual adjustment of edge positions.

These and other objects of the present invention are accomplished by providing a gated stage effective to block or pass range mark signals to the intensity control circuits of the cathode-ray indicator. This gated stage is controlled by inverse signals representative of the angular position of the antenna beam for producing a "fan" having edges independently positionable. The position of the "fan" is controlled by positional signals derived from the antenna position indicated thereby.

In the drawings:

Fig. 1 is a schematic block diagram of a system embodying the invention;

Fig. 2 is a schematic diagram of a circuit in accordance with the invention;

Figs. 3 and 4 are voltage diagrams useful in explaining the invention;

Fig. 5 is a schematic diagram of a modification according to invention; and

Fig. 6 is a diagram similar to Fig. 4 for Fig. 5.

Referring now to Fig. 1 there is shown a system having azimuth antenna 11 and an elevation antenna 12 with respective patterns represented in cross-section at 13 and 14. These antennas are suitably mounted to be driven to scan intersecting sectors of space along lines 9 and 10 by angle scans 18 and 19. The antennas are alternately energized by their respective radars 15 and 16 which are triggered from a trigger and gate circuit 17. The angle data 37 and 38, derived from scans 18 and 19, and the AZ and EL gates operate to control sweep circuits 25 to produce, on a cathode-ray tube 26, a composite azimuth-elevation (AZ—EL) display, as shown, in a manner, for example, disclosed and claimed in the copending application for a "System for Composite Cathode-Ray Tube Indication," Serial No. 170,326, filed June 26, 1950, and assigned to the aforementioned assignee. Echo signals received by the radars 15 and 16 from reflecting objects are supplied to a video amplifier 24, which produces changes in intensity on the screen of tube 26 at the points of the sweep corresponding to the positions of the objects. If a reflective object, such as aircraft 27, appears within the volume scanned by one of the antennas 11 or 12 a corresponding image 27' will appear on the respective AZ or EL display of tube 26. In the illustration of Fig. 1 it is assumed that the aircraft 27 is within the scan of the beam 13, but not that of beam 14, and thus appears at 27' on the AZ indication but does not appear on the EL indication.

The angle of elevation of the azimuth antenna 11 is controlled by a reversible motor 28 and a potentiometer 29 coupled thereto provides a voltage proportional to the elevational angle. In like manner the azimuth position of the elevational antenna 12 is controlled by a motor 30, with an azimuthal positional voltage being provided by a potentiometer 31 coupled thereto.

A range mark fan generator 32 supplies range marks to the AZ and EL indications in the form of fans 33 and 34 which represent the width, in the dimension displayed, of the antenna beam not sweeping in that dimension, as will be more fully explained hereinafter. For this purpose the generator 32 operates alternately to provide AZ or EL fans under the control of AZ and EL "on" gates 35 which are generated from the trailing edges of the opposite sweep gates from circuit 17. Also driven by these gates is a range mark generator 36 which provides the range mark input signal to the fan generator 32. The generator 32 is also under the control of the instantaneous angle of scan data of each antenna scanner from the respective azimuth angle and elevation angle data units 37 and 38 and the voltages from the potentiometers 29 and 31 representative of the orientation of the respective antenna beams 13 and 14 in the scanned dimension not scanned thereby.

In Fig. 2 the preferred embodiment of the present invention is shown which provides the improved range mark fan generator 32. Range marks are supplied from the generator 36 to a controlled amplifier 41 which provides amplified range marks from its plate circuit to the video amplifier 24 selectively under the control of the fan generator circuit, as will be explained. The grid bias for the amplifier 41 is determined by a voltage divider 42, 43 and the conductive condition of a triode 44, 44'. The triodes 44, 44' have the resistor 42 as a common plate load to the positive supply designated +150 v. and both cathodes are returned to a positive voltage, say +50 v. The circuits for the control of the triodes 44 and 44' have corresponding parts which will be described with respective features designated by reference characters and their primes. Conduction in tubes 44, 44' is controlled by direct coupling to the grids 45, 45' from the plate circuit of amplifiers 46, 46'. The amplifiers 46, 46' have plate resistors 47, 47' and operate with grounded cathodes.

Conduction in the tubes 46, 46' is controlled by direct coupling to grids 48, 48' from the plate circuits of tubes 49, 49' and from angle scan voltage inputs 51, 51' derived from data units 37 and 38, respectively, and position voltage inputs 52, 52'. The voltages 52, 52' are derived, respectively, from the arms of potentiometers 31 and 29. The tubes 49, 49' have plate resistors 53, 53' connected to an adjustable positive voltage source 54, 54' and their cathodes returned to a constant negative voltage, say −50 v. Conduction in tubes 49, 49' occurs when the resultant of the three voltages 51, 51'; 52, 52; and 56, 56' effective on the grids 55, 55' is more positive than cutoff voltage for these tubes with reference to the cathode potentials. The alternate AZ—EL fan generation control is achieved by providing normally non-conductive tubes 57, 57' in shunt with the tubes 46, 46'. The tubes 57, 57' are provided in their respective input circuits with the EL and AZ "on" gates. The "on" gate is the positive half-cycle of a square wave which is effective to render the tubes 57, 57' conducting thereby over-riding the control function of tubes 46, 46' during each positive half-cycle, as will more fully appear hereinafter.

Referring now to Figs. 3 and 4 the operation of the circuit of Fig. 2 in the system of Fig. 1 will be described. The letter designation for the various waveforms of Fig. 3 corresponds to that of the aforementioned copending application for a "System for Composite Cathode-Ray Tube Indication," which discloses means for their generation. Any other suitable means for generating the waveforms as shown would, of course, be satisfactory for the purpose of the present invention. The system trigger and gate circuit 17 generates the alternate AZ and EL triggers shown in Fig. 3 (E) and (D) and other waveforms utilized by the circuit and related to the triggers E and D. These triggers initiate the respective AZ and EL sweep gates shown in Fig. 3 (G) and (F) for controlling the range sweeps on the indicator tube 26. The sweep gates G and F are both supplied to the AZ and EL "on" gates circuit 35 and the range mark generator 36. The generator 36 provides calibrated range marks during each AZ and EL "on" gate as shown in Fig. 3 (L). The gate circuit 35 provides an "on" gate (i. e. a positive half-cycle) during each sweep gate as shown in Fig. 3 (K) and (J).

Consider now the action of only the left or AZ (unprimed) side of the circuit of Fig. 2. In Fig. 4 (A) the AZ angle data voltage 61 is shown. It is to be understood that the time scales for the voltage waves of Fig. 4 are much longer than those of Fig. 3. For example, in one GCA equipment a complete angle scan, corresponding to a rise and fall of the voltage 61, occurs in one-half second, whereas the repetition rate of the trigger pulses of Fig. 3 (E) and (D) is 1200 pulses per second. A portion of the voltage 61 is applied to each of grids 48 and 55 which are operating with respect to voltage levels established by the combination of a portion of the AZ positional voltage of the EL antenna applied at terminal 52 and the respective independently established voltages 54 and 56. These combination voltages at each of grids 48 and 55 are such that at the negative peak of voltage 61 neither of tubes 46 or 49 is conducting.

Under these conditions the tube 44 is conducting and tube 41 is biased from the plate circuit of tube 44 at a level such that range marks from the generator 36 are not amplified thereby. The scanning cycle produces a voltage 62 on grid 48 which rises with voltage 61. At a point 63 determined by the voltages 54 and that applied at terminal 52 the grid 48 is more positive than cutoff (E$co$) so that tube 46 conducts. A small additional rise in the voltage 61 tends to make the grid 48 positive and it remains at a level 64 of approximately zero volts with respect to its cathode. With the tube 46 conducting, tube 44 is cutoff and the bias on tube 41 is that determined by the voltage divider 42, 43. This bias is such that the range marks from generator 36 are amplified by the amplifier 41 and are effective to produce indications after video amplification. Also rising with the voltages 61 and 62 is a voltage 65 on the grid 55. This voltage 65 rises to a point 66 at which tube 49 becomes conductive (E$co$) and remains constant at a level 67 where the grid to cathode potential is approximately zero. At the point 66 and during portion 67 the conduction in tube 49 rapidly cuts off tube 46 by driving grid 48 negative along portion 68 of Fig. 4 (B). With tube 46 cutoff, tube 44 conducts and the bias on tube 41 is reduced to the non-amplifying level. When the voltage 61 passes its apex and starts to fall an inverse cycle of the events just described occurs producing a flat portion 69 at a corresponding position of the negative going portion of wave 62, thereby generating a non-intermittent fan for forward and reverse scans. These flat portions 64 and 69 plus the time of transition between E$co$ and E$gk$=0 in each instance represent the time intervals in each angle scan cycle during which range marks are effective to produce superimposed indications and hence control the generation of the range mark "fan."

The amplification of the range marks in amplifier 41, just described, takes place without interference from the right or EL side of the circuit due to the action of tube 57'. During each AZ sweep to positive AZ "on" gate is applied to tube 57' rendering it conductive and thus rendering tube 44' non-conductive. Hence, during AZ sweeps the intensity control of the display on tube 26 is controlled only by the voltage inputs to tubes 46 and 49 and is unaffected by the input voltage conditions of tubes 46' and 49'; tube 57 is cutoff during AZ sweeps by the negative half-cycle of the EL "on" gate. A similar cycle of operation obtains to gate range marks to the EL display of tube 26 under the control of the combined EL angle scan voltage at terminal 51' and the EL positional voltage of the AZ antenna at terminal 52' with reference to the adjustable voltages 54' and 56'. This gating occurs on the positive half cycles of the EL "on" voltage, while the left or AZ side of the circuit is rendered ineffective to gate tube 41 by conduction in tube 57.

The independently adjustable edges of the "fan" are obtained by means of voltages 54 and 56. For a given EL antenna position a predetermined voltage will appear at terminal 52 from potentiometer 31. The voltage 54 is adjusted to make tube 46 conductive (point 63) at the AZ angle scan voltage corresponding to an angle of orientation of the AZ antenna along an edge of the horizontal beamwidth of the EL antenna. The edges of the beamwidth are arbitrarily established and may be defined as the angle enclosing the half-power points of the radiation pattern in the plane of measurement. The voltage 56 is adjusted to make tube 49 conductive (point 66') at an AZ angle voltage corresponding to AZ antenna orientation along the other edge of the EL antenna horizontal beamwidth. Thus the duration of the "fan" as the AZ antenna scans is coincident with the scanning of the AZ angle occupied by the EL antenna horizontal beamwidth. As the EL antenna is moved in azimuth the positional voltage of potentiometer 31 varies the level for conduction in both tubes 46 and 49 in the same manner thus producing the "fan" indication at all times corresponding to the azimuth position of the EL antenna.

Obviously a like calibration and operation of the EL circuit is possible for obtaining a correct "fan" indication on the EL indicator of the elevational position of the AZ antenna.

Referring to Fig. 5 a modified embodiment is shown for controlling the amplifier 41. The circuit as shown provides for the generation of the azimuth positional fan of the EL antenna for display on an AZ indicator.

Duplication of the structure and function of this circuit to provide both AZ and EL "fans" will be obvious by analogy to the circuit of Fig. 2. In the circuit of Fig. 5 the amplifier 41 is properly biased to amplify range marks only when tubes 71 and 72 are both non-conductive. Tubes 71 and 72 have grids 73 and 74 which are supplied, with out-of-phase AZ positional voltages of the EL antenna from terminals 75 and 76. The AZ angle scan voltage is applied to one grid 73 from a terminal 77 and with a 180° phase reversal to the other grid 74 from a terminal 78. The tubes 71 and 72 have cathodes 79 and 80 connected to negative variable diverse voltage points 81 and 82 along a voltage divider 83.

The operation of the circuit of Fig. 5 will be described with reference to the voltage diagram of Fig. 6. The angle scan voltage 84 on grid 73 rises and falls and the inverse voltage 85 on grid 74 falls and rises in accordance with the AZ angle scan. Assume the voltages 81 and 82 are set at some level say −50 and −45 volts, respectively, and that the voltage at the terminals 75 and 76 is sufficiently negative so that both tubes 71 and 72 are non-conductive at the negative peaks of the voltages 84 and 85. The voltage 84 rises to a value near −50 v. and tube 71 conducts for a period 86 during which the grid 73 remains at a constant potential. At the point 87 the voltage of the grid 73 falls and conduction in tube 71 ceases. As voltage 85 is below the conduction level for tube 72, the cessation of conduction in tube 71, at point 87, provides the initiation of the range mark fan with both tubes 71 and 72 non-conductive. The voltage 85 continues to rise to the point 88 at which tube 72 conducts, at which point the "fan" is terminated. An inverse cycle generates a "fan" on the reverse scan between points 89 and 90.

By adjusting the voltages 81 and 82, it is apparent that the position and width of the "fan" may be selected to coincide with the horizontal beamwidth of the EL antenna pattern. As the EL antenna position varies, the out-of-phase voltages supplied to terminals 75 and 76 vary in opposite directions the negative levels from which the voltages 84 and 85 rise, hence varying the position of the "fan" with respect to the AZ scan without variation in its width. The "fan" thus displays the azimuth location of the EL antenna.

While specific embodiments of the present invention have been described, it will be apparent to those skilled in the art that many modifications thereof are possible without departing from the spirit and scope of the present teaching.

What is claimed is:

1. In a radar system having an antenna scanning in one coordinate and a cathode-ray tube display of said coordinate and range, means for displaying on said tube the position of an element movable in said coordinate comprising means for developing a voltage corresponding to the scanning position of said antenna, means for sensing the position of said element in said coordinate, means for producing a composite signal of said voltage modified by a variable derived from said sensing means representative of said position, means responsive to a first predetermined level of said signal for initiating an intensity indication on said display, means responsive to a second predetermined level of said signal for terminating said intensity indication and means for independently adjusting said predetermined levels.

2. In a radar system having an antenna scanning in one coordinate and a cathode-ray tube display of said coordinate and range, means for displaying on said tube the position of an element movable in said coordinate comprising means for developing a voltage corresponding to the scanning position of said antenna, means for developing a voltage inverse of the first developed voltage, means for sensing the position of said element in said coordinate, means for producing composite signals of said developed and inverse voltages modified by a variable derived from said sensing means representative of said position, a deactuable translating device for supplying intensity modifying signals to said cathode-ray tube, a pair of control devices independently operable to deactuate said translating device, means for supplying said composite signals to respective ones of said control devices and means for independently adjusting the deactuating level of operation of said control devices.

3. In a radar system having an antenna scanning in one coordinate and a cathode-ray tube display of said coordinate and range, means for displaying on said tube the position of an element movable in said coordinate comprising means for developing a scanning voltage corresponding to the scanning position of said antenna, means for sensing the position of said element in said coordinate, means for producing a composite signal of said voltage modified by a variable derived from said sensing means representative of said position, a deactuable translating device for supplying intensity modifying signals to said cathode-ray tube, means including a control device operable to deactuate said translating device in accordance with a first conductive condition of said control device, and to cease said deactuation in accordance with a second conductive condition of said device, said last named means including means responsive to values of said composite signal in excess of a first predetermined value for establishing said first conductive condition and means responsive to values of said composite signal in excess of a second predetermined value for establishing said second conductive condition.

4. The device according to claim 3 and including means for independently adjusting said predetermined values.

5. In a radar system having an antenna scanning in one coordinate and a cathode-ray tube display of said coordinate and range, means for displaying on said tube the position of an element movable in said coordinate comprising means for developing a scanning voltage corresponding to the scanning position of said antenna, means for sensing the position of said element in said coordinate, a deactuable translating device for supplying intensity modifying signals to said cathode-ray tube, means including a control device operable to deactuate said translating device in accordance with the conductive condition of said control device, first and second control devices operable to deactuate said translating device in accordance with the conductive condition of either one of said first or second devices, means for supplying said voltage in out-of-phase control relation to respective ones of said first and second devices, means for oppositely varying the operable bias levels for said first and second devices in accordance with a variable derived from said sensing means representative of said position, means for independently establishing individual reference voltage levels for said first and second devices, and means for adding said scanning voltage, said bias and said reference voltage individual to each of said first and second devices for controlling conduction, respectively, therein.

6. In a radar system having an antenna scanning in one coordinate and a cathode-ray tube display of said coordinate and range, means for displaying on said tube the position of an element movable in said coordinate comprising means for developing a voltage corresponding to the scanning position of said antenna, means for sensing the position of said element in said coordinate, means for producing a composite signal of said voltage modified by a variable derived from said sensing means representative of said position, a deactuable translating device for supplying intensity modifying signals to said cathode-ray tube, a first control device operable to deactuate said translating device, a second control device operable to operate said first control device, a third control device operable to operate said second control device, means for supplying said composite signal in control relation to said second and third control devices and means for independently establishing the operating level of said second and third control devices with respect to said composite signal.

7. The device according to claim 6 and including an additional control device operable to operate said first control device, and control signal means operable to operate said additional control device.

8. In an actuation control circuit for controlling a translating device with respect to a periodic wave for providing translation thereby during a predetermined portion of said wave, means for controlling translation by said device comprising, a first control device operable to deactuate said translating device, a second control device operable to operate said first control device, a third control device operable to operate said second control device, means for combining a control voltage with said periodic wave to form a composite signal, means for supplying said composite signal in control relation to said second and third control devices, and means for independently establishing the operating level of said second and third control devices with respect to said composite signal.

9. In a radar system having a pair of antennas scanning sectors in independent coordinates and a cathode-ray tube display of said coordinates and range, means for displaying on said tube the sectors scanned by said antennas and the angular position of each antenna in the sector not scanned thereby comprising, means for developing respective scanning voltages corresponding to the scanning position of said antennas, means for sensing said angular position of said antennas, means for producing composite signals of each said scanning voltage modified by a variable derived from said sensing means representative of said angular position of the other antenna, a deactuable translating device for supplying intensity modifying signals to said cathode-ray tube, means including a pair of control device channels operable to deactuate said translating device in accordance with the conductive condition of either control device in said channels, said last named means including means responsive to values of said respective composite signals in excess of first predetermined values for altering said conductive conditions, means responsive to values of said respective composite signals in excess of second predetermined values for restoring said conductive conditions to their original state, and means for alternating control of said translating device by said control channels.

10. The device according to claim 9 and including means for independently adjusting said first and second predetermined values in both said channels.

References Cited in the file of this patent

UNITED STATES PATENTS

| | | |
|---|---|---|
| 2,483,644 | Kelsey | Oct. 4, 1949 |
| 2,556,699 | Lozier | June 12, 1951 |
| 2,575,087 | Baker | Nov. 13, 1951 |
| 2,577,166 | Tolson | Dec. 4, 1951 |
| 2,585,855 | Sherwin et al. | Feb. 12, 1952 |
| 2,586,957 | Keizer | Feb. 26, 1952 |
| 2,649,581 | Tasker | Aug. 18, 1953 |